US012455603B2

(12) United States Patent
Khamesra et al.

(10) Patent No.: US 12,455,603 B2
(45) Date of Patent: Oct. 28, 2025

(54) UNIVERSAL SERIAL BUS POWER DELIVERY (USB-PD)

(71) Applicant: Cypress Semiconductor Corporation, San Jose, CA (US)

(72) Inventors: Arun Khamesra, Bangalore (IN); Hariom Rai, Bangalore (IN); Soon Hwei Tan, Singapore (SG)

(73) Assignee: Cypress Semiconductor Corporation, San Jose, CA (US)

( * ) Notice: Subject to any disclaimer, the term of this patent is extended or adjusted under 35 U.S.C. 154(b) by 86 days.

(21) Appl. No.: 18/475,001

(22) Filed: Sep. 26, 2023

(65) Prior Publication Data

US 2025/0103119 A1 Mar. 27, 2025

(51) Int. Cl.
| | |
|---|---|
| G06F 1/26 | (2006.01) |
| G06F 1/3215 | (2019.01) |
| G06F 1/3234 | (2019.01) |
| G06F 1/3287 | (2019.01) |
| H02M 1/00 | (2007.01) |

(52) U.S. Cl.
CPC ............ *G06F 1/266* (2013.01); *G06F 1/3215* (2013.01); *G06F 1/3253* (2013.01); *G06F 1/3287* (2013.01); *H02M 1/0032* (2021.05); G06F 2213/0042 (2013.01)

(58) Field of Classification Search
CPC ...... G06F 1/266; G06F 1/3206; G06F 1/3215; G06F 1/3253; G06F 1/3278; G06F 1/3287; G06F 1/3296; G06F 2213/0042; H02M 1/0032; H02M 1/0035; H02M 1/322; H02M 1/36; H02J 9/007
See application file for complete search history.

(56) References Cited

U.S. PATENT DOCUMENTS

| | | | | |
|---|---|---|---|---|
| 8,575,917 B2* | 11/2013 | Sims | .......................... | H02J 9/06 |
| | | | | 324/120 |
| 9,912,243 B2* | 3/2018 | Quigley | ............ | H02M 3/33515 |
| 10,199,921 B2* | 2/2019 | Chung | .................... | H02M 1/15 |
| 10,693,384 B1* | 6/2020 | Mondal | ............. | H02M 3/33592 |

(Continued)

OTHER PUBLICATIONS

"Efficiency Standards for External Power Supplies", CUI Inc., 2019, 10 pages.

*Primary Examiner* — Thomas J. Cleary

(57) ABSTRACT

A method of operating a Universal Serial Bus Power Delivery (USB-PD) power converter includes responsive to detecting an absence of a load device sending a low power mode signal from a secondary-side controller, coupled to control a secondary-side of the USB-PD power converter, to a primary-side controller coupled to control a primary-side of the USB-PD power converter, and transitioning the secondary-side controller from a secondary-side active mode to a secondary-side low power mode, transitioning the primary-side controller from a primary-side active mode to a primary-side low power mode responsive to receiving the low power mode signal, responsive to detecting a connection of the load device sending an active mode signal from the secondary-side controller to the primary-side controller, and transitioning the secondary-side controller from the secondary-side low power mode to the secondary-side active mode, and transitioning the primary-side controller from the primary-side low power mode to the primary-side active mode.

20 Claims, 9 Drawing Sheets

(56) References Cited

U.S. PATENT DOCUMENTS

| | | | |
|---|---|---|---|
| 10,910,954 B1* | 2/2021 | Shah | H01R 24/60 |
| 10,985,663 B2* | 4/2021 | Chung | H02M 3/33523 |
| 11,211,874 B2* | 12/2021 | Yu | H02M 3/33592 |
| 2002/0190579 A1* | 12/2002 | Odaohhara | G06F 1/26 |
| | | | 307/126 |
| 2008/0117994 A1* | 5/2008 | Shetty | H04L 25/45 |
| | | | 375/257 |
| 2010/0202161 A1* | 8/2010 | Sims | H02M 7/02 |
| | | | 363/20 |
| 2011/0103104 A1* | 5/2011 | Zhan | H02M 3/33507 |
| | | | 363/21.17 |
| 2011/0128153 A1* | 6/2011 | Sims | G06F 1/325 |
| | | | 307/66 |
| 2012/0139477 A1* | 6/2012 | Oglesbee | H02J 9/005 |
| | | | 307/130 |
| 2012/0206947 A1* | 8/2012 | Haight | H02M 7/217 |
| | | | 363/84 |
| 2014/0016359 A1* | 1/2014 | Telefus | H02M 1/36 |
| | | | 363/16 |
| 2015/0219711 A1* | 8/2015 | Sumiyoshi | G01R 31/2635 |
| | | | 324/762.01 |
| 2015/0311806 A1* | 10/2015 | Kim | H02M 3/33507 |
| | | | 363/21.17 |
| 2016/0308452 A1* | 10/2016 | Motoki | H02J 7/02 |
| 2017/0207694 A1* | 7/2017 | Strijker | H02M 3/073 |
| 2017/0279369 A1* | 9/2017 | Meng | H02M 7/06 |
| 2018/0375437 A1* | 12/2018 | Liu | H02M 3/33523 |
| 2020/0287454 A1* | 9/2020 | Lee | G06F 1/266 |
| 2021/0021199 A1* | 1/2021 | Liu | H02M 3/33569 |
| 2023/0096383 A1* | 3/2023 | Adragna | H02M 1/0035 |
| | | | 363/21.13 |
| 2024/0007099 A1* | 1/2024 | Kuratli | H03K 17/166 |
| 2024/0250554 A1* | 7/2024 | Codato | H02M 1/0032 |

* cited by examiner

UNIVERSAL SERIAL BUS POWER DELIVERY (USB-PD)

BACKGROUND

Various electronic devices (e.g., such as smartphones, tablets, notebook computers, laptop computers, hubs, chargers, adapters, etc.) are configured to transfer power through Universal Serial Bus (USB) connectors according to USB power delivery protocols defined in various revisions of the USB Power Delivery (USB-PD) specification. Alternating current to direct current (AC-DC) converters convert power from an alternating current (AC) source to a direct current (DC) source at a specified voltage level.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In an embodiment of the techniques presented herein, a secondary-side controller for a Universal Serial Bus Power Delivery (USB-PD) power converter comprises.

In an embodiment of the techniques presented herein, a Universal Serial Bus Power Delivery (USB-PD) system comprises a transformer comprising a primary-side coupled to receive a rectified alternating current (AC) input voltage at an input port, and a secondary-side connected to provide a direct current (DC) output voltage at an output port, a first power switch connected to the primary-side, a primary-side controller coupled to the first power switch to control operation of the transformer, wherein the primary-side controller is configured to transition from a primary-side active mode to a primary-side low power mode responsive to receiving a low power mode signal, and transition from the primary-side low power mode to the primary-side active mode responsive to receiving an active mode signal, and a secondary-side controller coupled to the output port, wherein the secondary-side controller configured to, responsive to detecting an absence of a load device on the output port, send the low power mode signal to the primary-side controller and transition from a secondary-side active mode to a secondary-side low power mode, and responsive to detecting a connection of the load device to the output port, transition from the secondary-side low power mode to the secondary-side active mode and send the active mode signal to the primary-side controller.

In an embodiment of the techniques presented herein, a system for operating a Universal Serial Bus Power Delivery (USB-PD) power converter comprises means for responsive to detecting an absence of a load device on an output port of the USB-PD power converter sending a low power mode signal from a secondary-side controller, coupled to control a secondary-side of the USB-PD power converter, to a primary-side controller coupled to control a primary-side of the USB-PD power converter, and transitioning the secondary-side controller from a secondary-side active mode to a secondary-side low power mode, means for transitioning the primary-side controller from a primary-side active mode to a primary-side low power mode responsive to receiving the low power mode signal, means for responsive to detecting a connection of the load device to the output port sending an active mode signal from the secondary-side controller to the primary-side controller, and transitioning the secondary-side controller from the secondary-side low power mode to the secondary-side active mode, and means for transitioning the primary-side controller from the primary-side low power mode to the primary-side active mode responsive to receiving the active mode signal.

In an embodiment of the techniques presented herein, a method of operating a Universal Serial Bus Power Delivery (USB-PD) power converter comprises responsive to detecting an absence of a load device on an output port of the USB-PD power converter sending a low power mode signal from a secondary-side controller, coupled to control a secondary-side of the USB-PD power converter, to a primary-side controller coupled to control a primary-side of the USB-PD power converter, and transitioning the secondary-side controller from a secondary-side active mode to a secondary-side low power mode, transitioning the primary-side controller from a primary-side active mode to a primary-side low power mode responsive to receiving the low power mode signal, responsive to detecting a connection of the load device to the output port sending an active mode signal from the secondary-side controller to the primary-side controller, and transitioning the secondary-side controller from the secondary-side low power mode to the secondary-side active mode, and transitioning the primary-side controller from the primary-side low power mode to the primary-side active mode responsive to receiving the active mode signal.

In an embodiment of the techniques presented herein, a Universal Serial Bus Power Delivery (USB-PD) system comprises a transformer comprises a primary-side coupled to receive a rectified alternating current (AC) input voltage at an input port, and a secondary-side connected to provide a direct current (DC) output voltage at an output port, a first power switch connected between the input port and the primary-side, a second power switch connected between the output port and the secondary-side, a primary-side controller coupled to the first power switch, and a secondary-side controller coupled to the second power switch, wherein the secondary-side controller is configured to, responsive to detecting an absence of a load device on the output port, send a low power mode signal to the primary-side controller and transition from a secondary-side active mode to a secondary-side low power mode, the primary-side controller is configured to transition from a primary-side active mode to a primary-side low power mode responsive to receiving the low power mode signal, and wherein a power consumption of the transformer, the primary-side controller in the primary-side low power mode, and the secondary-side controller in the secondary-side low power mode is less than 5 mW.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1A:
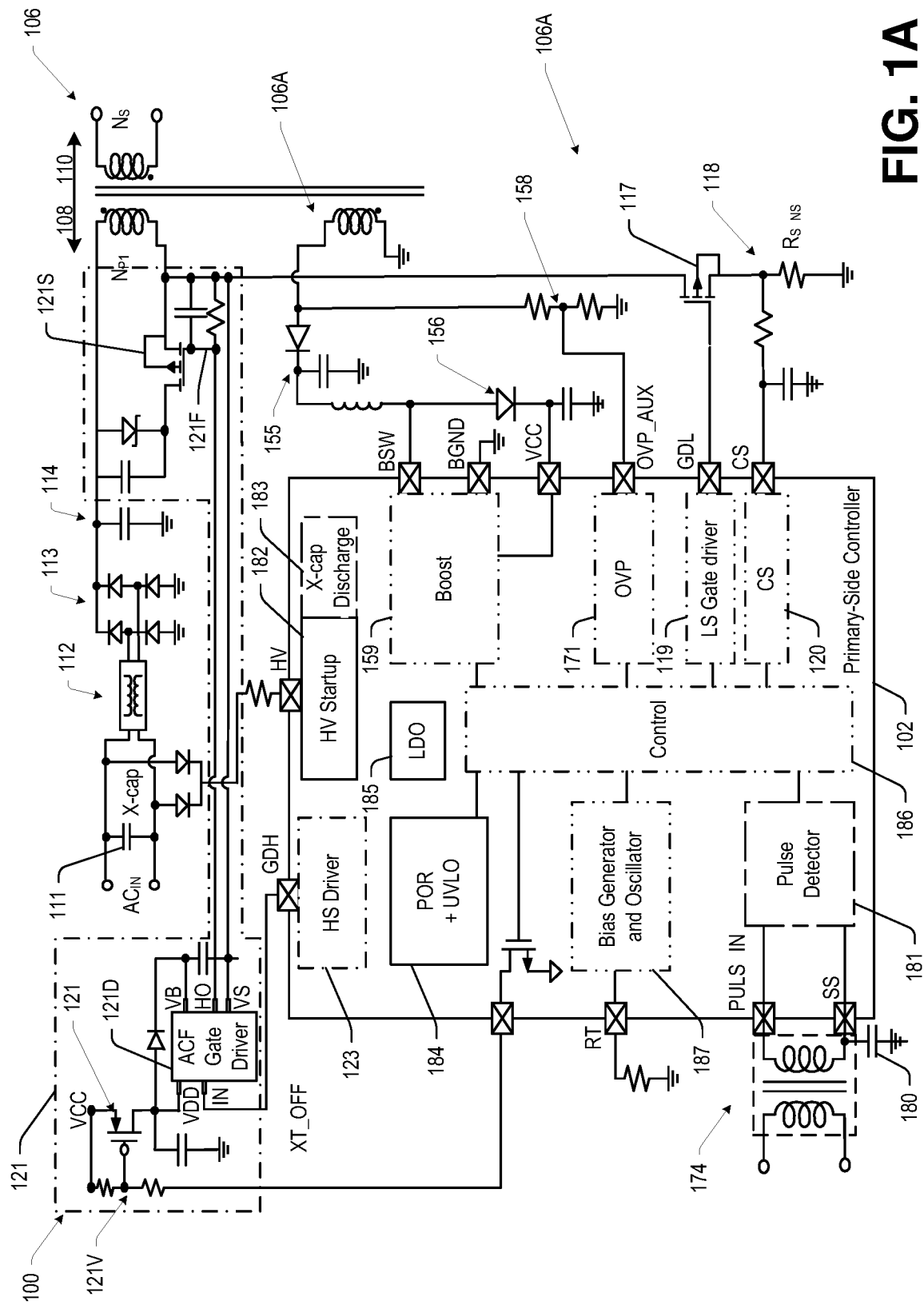
FIGS. 1A and 1B provide a schematic block diagram of a power converter, according to some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

It is to be understood that the following description of embodiments is not to be taken in a limiting sense. The scope of the present disclosure is not intended to be limited by the embodiments described hereinafter or by the drawings, which are taken to be illustrative only. The drawings are to be regarded as being schematic representations and elements illustrated in the drawings are not necessarily shown to scale. Rather, the various elements are represented such that their function and general purpose become apparent to a person skilled in the art.

All numerical values within the detailed description and the claims herein are modified by "about" or "approximately" the indicated value, and take into account experimental error and variations that would be expected by a person having ordinary skill in the art.

Power converters provide current and power during the various operating circumstances of the power converter, which include normal conditions, load-transient conditions, and output-fault conditions. There are time periods where the power converter is coupled to an external power supply (e.g., AC source), but no load device is coupled to the power converter. During such an absent load state, the power converter is transitioned to a low power mode. In some embodiments, the power converter comprises a primary side coupled to the external power supply and a secondary side connected to the load device. The primary side is controlled by a primary-side controller, and the secondary side is controlled by a secondary-side controller. Responsive to the secondary-side controller detecting an absent load state, the secondary-side controller signals the primary-side controller to enter a low power mode. Upon both the primary-side controller and the secondary-side controller entering the low power mode the power consumption of the power converter may be reduced to less than 5 mW.

Figure 1B:
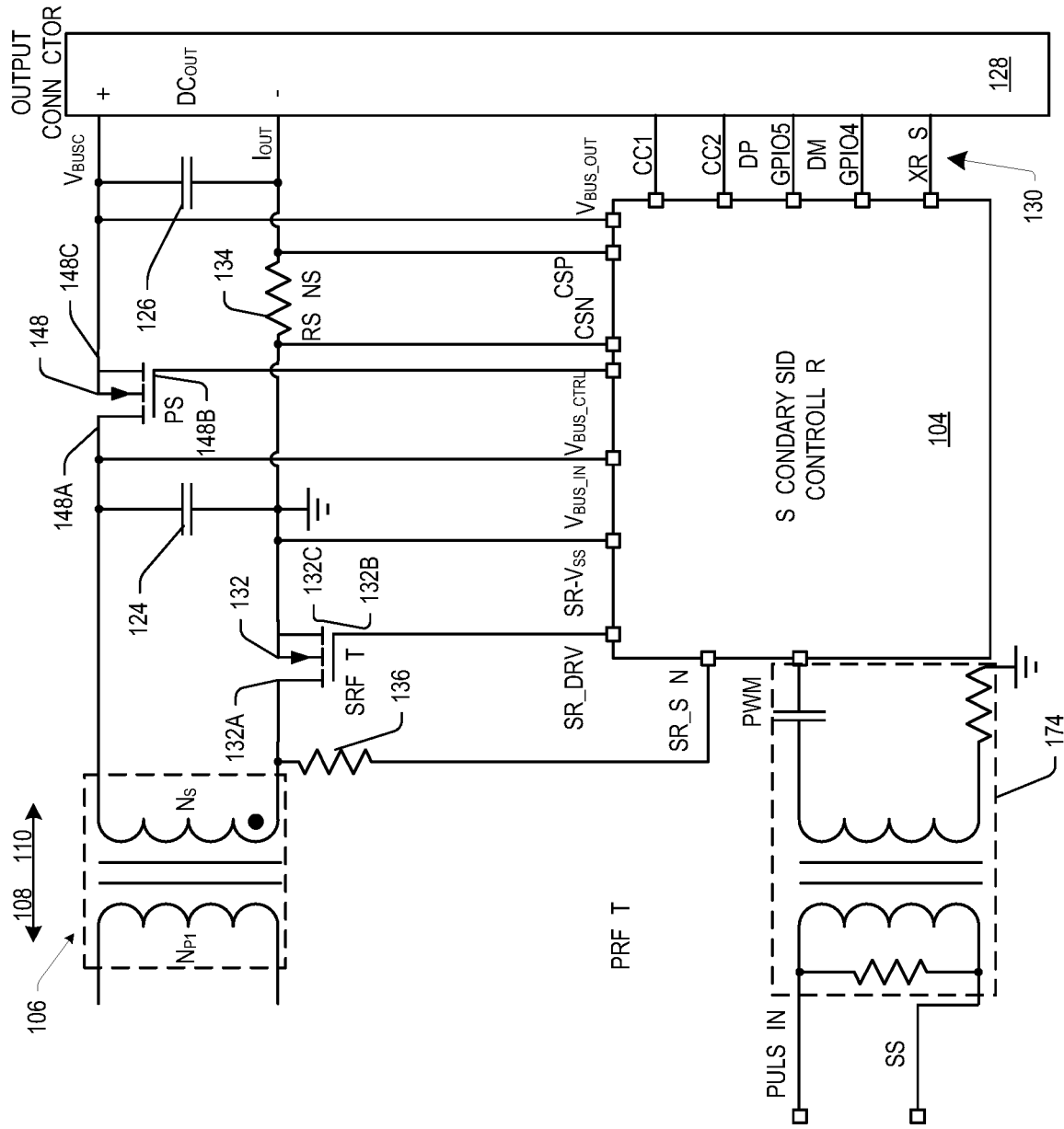

FIGS. 1A and 1B provide a schematic block diagram of a power converter 100, according to some embodiments. In some embodiments, the power converter 100 is an AC-DC power converter operating in discontinuous conduction mode (DCM). The power converter 100 comprises a primary-side controller 102 and a secondary-side controller 104 for controlling a flyback transformer 106 having a first winding ($N_{P1}$) on a primary side 108 electrically coupled to an AC input ($AC_{IN}$), and a secondary winding ($N_S$) on a secondary side 110 connected to a DC output ($DC_{OUT}$). The AC input is connected to a first terminal of the flyback transformer 106 through an across-the-line capacitor (X-cap) 111, an electromagnetic interference (EMI) filter 112, a bridge rectifier 113, and one or more input filters 114. In some embodiments, the AC input is a sinusoidal signal having an amplitude of between about 85V and 285V. A power switch 117, such as a primary field effect transistor (PRFET), has a first or drain node connected to a second terminal of the flyback transformer 106, a gate node connected to the primary-side controller 102, and a third or source node connected to the primary-side controller 102 through a current sensing element 118 connected to ground to sense a primary side current flowing through the primary winding when the power switch 117 is closed or conducting. A low side (LS) gate driver 119 in the primary-side controller 102 controls the power switch 117. A current sense unit 120 in the primary-side controller 102 monitors the current from the current sensing element 118. In some embodiments, the primary side 108 comprises an active clamp flyback (ACF) circuit 121. The ACF circuit 121 includes an ACF switch 121S controlled by an ACF gate driver 121D. A high side (HS) driver 123 in the primary-side controller 102 controls the ACF gate driver 121D to drive the ACF switch 121S and provide ACF functionality. In some embodiments, the ACF circuit 121 is omitted, and the power converter 100 operates in a quasi-resonant mode.

On the secondary side 110, the power converter 100 includes a filter capacitor 124 connected between a third terminal of the flyback transformer 106 and an electrical ground or ground terminal, and an output capacitor 126 connected between the third terminal and electrical ground provide a DC output voltage to an output interface, such as an output connector 128. In some embodiments, the capacitance of the filter capacitor 124 is between about 500 and 1000 µF, such as about 680 µF. Generally, as in the embodiment shown, the output connector 128 is further connected to the secondary-side controller 104 through a number of communication channels 130 to support various charging protocols. Suitable output connectors 128 can include those compatible with and supporting standard and proprietary charging protocols including Universal Serial Bus Power Delivery USB PD2.0 and USB PD3 with Programmable Power Supply (PPS), Qualcomm® Quick Charge, Samsung® AFC, and Apple® charging protocols. For example, the output connector 128 can include a Universal Serial Bus C (USB-C) compatible connector where the power converter 100 is compliant with the USB protocol to provide a DC output voltage of about 3.3 VDC to about 21.5 VDC (or higher, in case of Extended Power Range, EPR) at a current of up to substantially 5 amps (A).

In some embodiments, the power converter 100 includes, on the secondary side 110, a synchronous rectifier (SR) field effect transistor 132 (SRFET) connected between the flyback transformer 106 and through a current sense resistor 134 (RSENSE) to a negative terminal of the DC output. The SRFET 132 includes a drain node 132A connected to the fourth terminal of the flyback transformer 106, and through a resistor 136, to an SR sense pin (SR_SEN) of the secondary-side controller 104 to sense a voltage on the drain node 132A of the SRFET 132, a gate node 132B connected to an SR gate drive pin (SR_DRV) of the secondary-side controller 104 to drive or control the SRFET 132, and a source node 132C connected to the negative DC output and to the secondary-side controller 104 through a SR-Vss ground voltage level pin (SR-Vss). A first node of the RSENSE resistor 134 is connected to a current sensing negative pin (CSN) of the secondary-side controller 104, and a second node connected to the negative terminal of the DC output and to a current sensing positive pin (CSP), to enable the secondary-side controller 104 to sense the output current, $I_{OUT}$, from the power converter 100. In some embodiments, the resistance of the RSENSE resistor 134 is between about 3 and 10 Mohm, such as 5 Mohm.

Optionally, as in the embodiment shown, the secondary side 110 includes an additional or secondary provider switch (PS) 148, such as a NFET, connected between the flyback transformer 106 and a positive terminal of the DC output to enable to the secondary-side controller 104 to turn off the DC output to protect against over voltage and/or under voltage conditions. The PS switch 148 includes a source node 148A connected to a voltage_bus_in pin ($V_{BUS\_IN}$) of the secondary-side controller 104, a gate node 148B connected to a voltage bus control pin ($V_{BUS\_CTRL}$) to drive or control the PS switch 148, and a drain node 148C connected to a voltage bus out pin ($V_{BUS\_OUT}$) and to the positive terminal of the DC output.

The flyback transformer 106 in the power converter 100 provides an isolation circuit or barrier to electrically isolate the secondary side 110 from the high AC input voltage present on the primary side 108. In the example embodiment of FIGS. 1A-1B, the isolation barrier also includes an auxiliary coil of the flyback transformer 106, which functions as a flyback step-down transformer 106A to provide power to primary-side controller 102. The flyback step-down transformer 106A is coupled through a rectifier 155 to a Boost pin (BSW) of the primary-side controller 102 and through a rectifier 156 to a VCC pin of the primary-side controller 102. A boost ground pin (BGND) of the primary-side controller 102 is grounded. A boost unit 159 in the primary-side controller 102 is used as a boosting circuit to provide VCC to primary-side controller 102. A resistor divider 158 connected to an over voltage protection (OVP_AUX) pin of the primary-side controller 102 is used to sense a reflected voltage of $V_{BUS\_IN}$ (i.e., the secondary side input voltage) on the secondary side 110 via the flyback step-down transformer 106A. An OVP unit 171 in the primary-side controller 102 disables the power switch 117 if an over voltage condition is detected.

Additionally where, as in the example embodiment of FIGS. 1A-1B, the power converter 100 uses a pulse width modulation (PWM) signal provided to primary-side controller 102 from a PWM drive pin on the secondary-side controller 104, the isolation barrier can further include a pulse transformer 174 connected between the PWM drive pin and a PULSEIN pin and a soft-start (SS) pin of the primary-side controller 102. The SS pin may be connected to ground through a capacitor 180. The secondary-side controller 104 controls a width of the PWM signal based on power required on the DC output, which turns on the power switch 117 to start a switching cycle to optimize or increase efficiency of the power converter 100. A pulse detector 181 in the primary-side controller 102 detects signals communicated by the secondary-side controller 104 over the pulse transformer 174.

In some embodiments, the primary-side controller 102 comprises a high voltage startup unit 182 that monitors the voltage on the X-cap 111 and an X-cap discharge unit 183 that discharges the X-cap 111 if the $AC_{IN}$ signal is removed, for example by unplugging the power converter 100. In some embodiments, the X-cap 111 is omitted. A power-on reset (POR) and undervoltage lockout unit (OLU) 184 provides reset and undervoltage protection functionality. A low dropout regulator 185 generates an internal voltage for the primary-side controller 102. A control unit 186 receives signals from the boost unit 159, the CS unit 120, the OVP unit 171, and the pulse detector 181. A bias generator and oscillator 187 provides clock signals to the control unit 186 used in creating PWM signals for controlling the power switch 117 and the ACF gate driver 121D.

In some embodiments, the power converter 100 is configured for DCM operation. In DCM, during each switching cycle, the current in the secondary winding ($N_S$) of the flyback transformer 106 decreases to zero before the primary side 108 is turned on. The magnetic flux built up in the transformer core when primary side is on, causes current to flow through the secondary winding ($N_S$) of the flyback transformer 106 once the primary side power switch 117 is turned off. When the current flowing through the secondary winding ($N_S$) of the flyback transformer 106 decreases to zero, the secondary-side controller 104 signals the primary-side controller 102 (e.g., through the pulse transformer 174) to start a new switching cycle.

Figure 2:
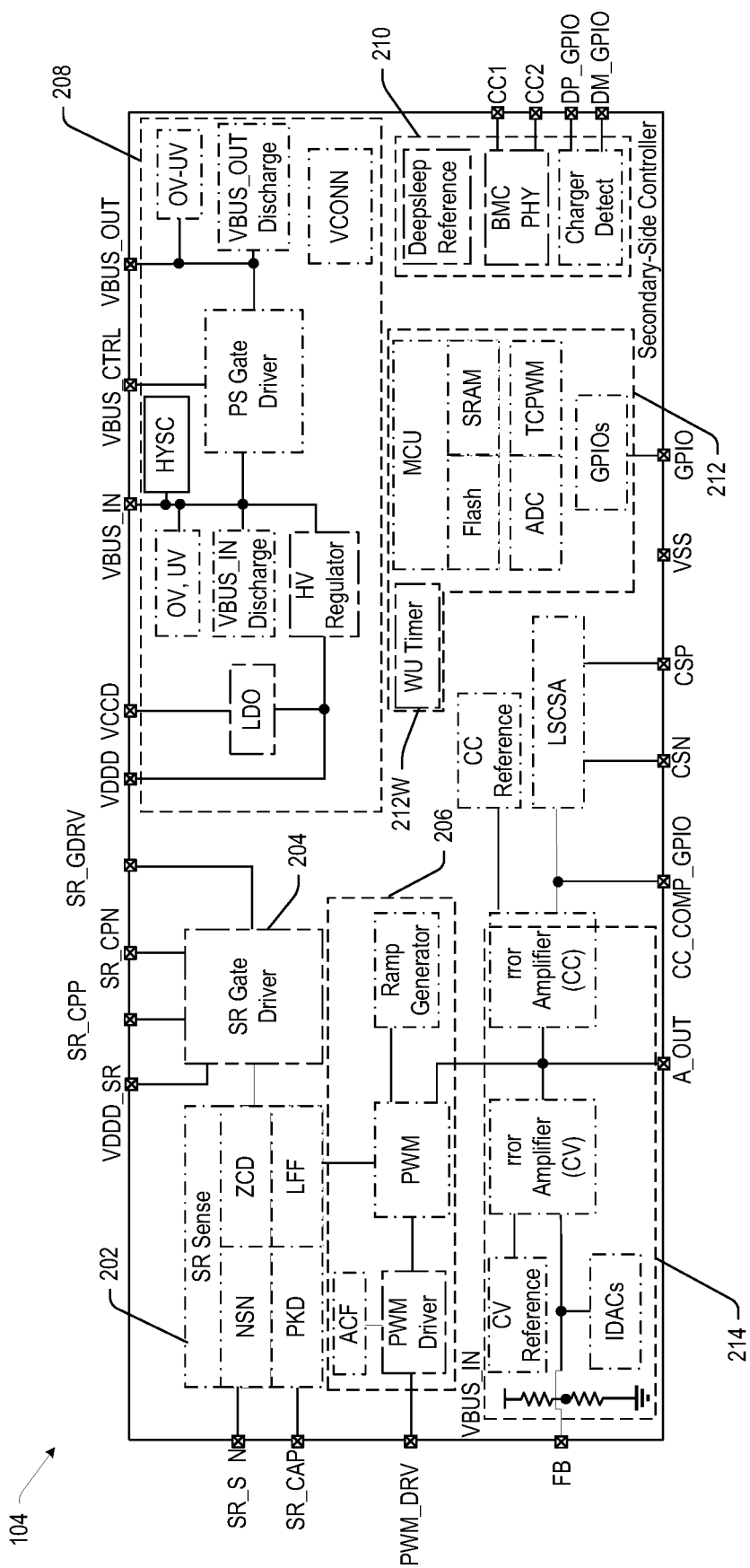
FIG. 2 is a block diagram of a secondary-side controller, according to some embodiments.

FIG. 2 is a block diagram of the secondary-side controller 104, according to some embodiments. The secondary-side controller 104 generally further includes an SR sense unit 202 and a SR gate driver 204 coupled to the gate node of the SRFET 132 through an SR_GDRV pin. The SR sense unit 202 is coupled to the drain node of the SRFET 132 through an SR-SNS pin and through an SR-Vss pin to the source node of the SRFET 132. The SR sense unit 202 generally includes a zero-crossing detector (ZCD) block, a negative-sensing (NSN) block, a peak-detector (PKD) block, and a line-feed-forward (LFF) block for sensing a voltage on the drain of the SRFET 132 to sense or detect a zero-crossing, a negative voltage, a peak (positive) voltage and a feed-forward operation. One or more outputs of the SR sense unit 202 are coupled to the SR gate driver 204 to control the SRFET 132 and to a pulse width modulation (PWM) circuit 206 to provide a signal through the PWM drive pin PWM_DRV to the primary-side controller 102 to control the power switch 117. The PWM circuit 206 includes a ramp generator and a pulse width modulator (PWM) for generating a signal having a modulated pulse width, a PWM driver for boosting a voltage of the signal to that necessary for driving the primary-side controller 102 or the power switch 117, and an ACF for controlling the PWM driver during active clamp flyback operation.

The secondary-side controller 104 further includes a secondary side provider FET (SSPF) circuit 208. The SSPF circuit 208 includes a provider FET switch (PS) gate driver for driving the PS switch 148, OV-UV circuits or blocks for detection over voltage (OV) and under voltage (UV) conditions on $V_{BUS\_IN}$ and $V_{BUS\_OUT}$; low dropout (LDO) and high voltage (HV) regulators; discharge circuits or blocks for discharging $V_{BUS\_IN}$ and $V_{BUS\_OUT}$, and a VCONN block for repurposing a CC pin for powering electronics in a USB Type-C cable during power delivery mode, and a hysteresis comparator (HYS C) block for regulating $V_{BUS\_IN}$ within hysteresis levels in low power mode.

An interface circuit 210 includes circuits or blocks for communicating with a device being powered or charged by the secondary-side controller 104 to support various charging protocols. These circuits or blocks can include a biphase mark code (BMC) and physical layer (PHY) to communicate with device using certain charging protocols, a charger detect block, and a deepsleep reference block for providing a minimum output voltage reference and current during low power mode operation.

The secondary-side controller 104 includes a microcontroller unit (MCU) subsystem 212 including logic and a microprocessor or controller for executing programs stored memory in the MCU subsystem; analog-to-digital converters (ADC); a multipurpose Timer Counter Pulse Width Modulator (TCPWM) capable of performing a multiple functions necessary for operation of the MCU; and a number of general purpose input/outputs (GPIOs), only one of which is shown. The secondary-side controller 104 includes a feedback circuit 214 coupled to the feedback pin to provide error correction to the PWM circuit 206, and, in certain embodiments of the isolation barrier to provide a feedback signal to the primary-side controller 102. In some embodiments, the feedback circuit 216 includes a constant-voltage (CV) reference, a constant current (CC) reference, one or more error amplifiers and Current DACs (digital analog converters) (IDACs), a low-side current sense amplifier (LSCSA), and a short circuit protection (SCP) block.

Figure 3A:
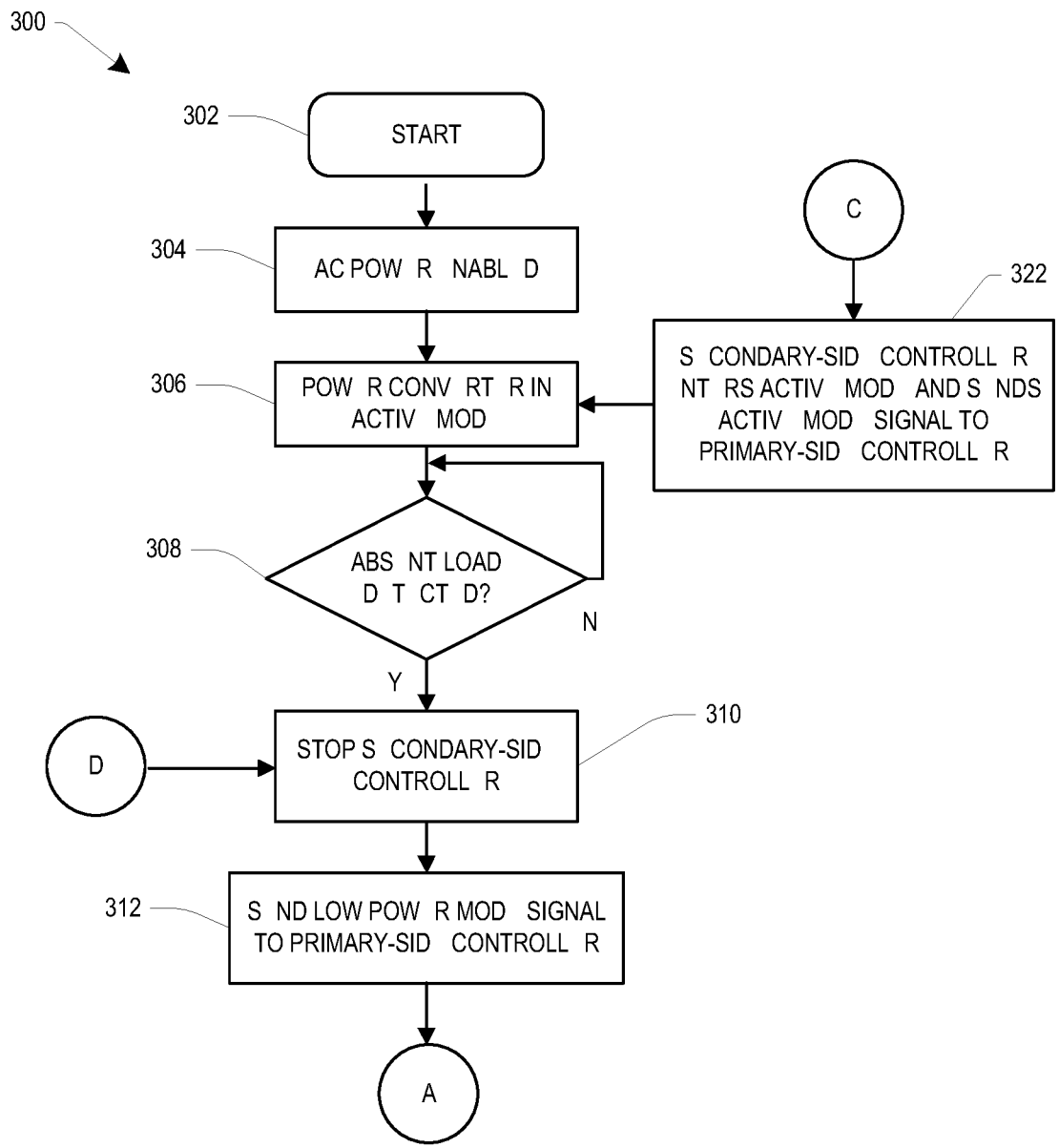
FIGS. 3A-3C illustrate a flow diagram of a method for power mode control, according to some embodiments.
Figure 3B:
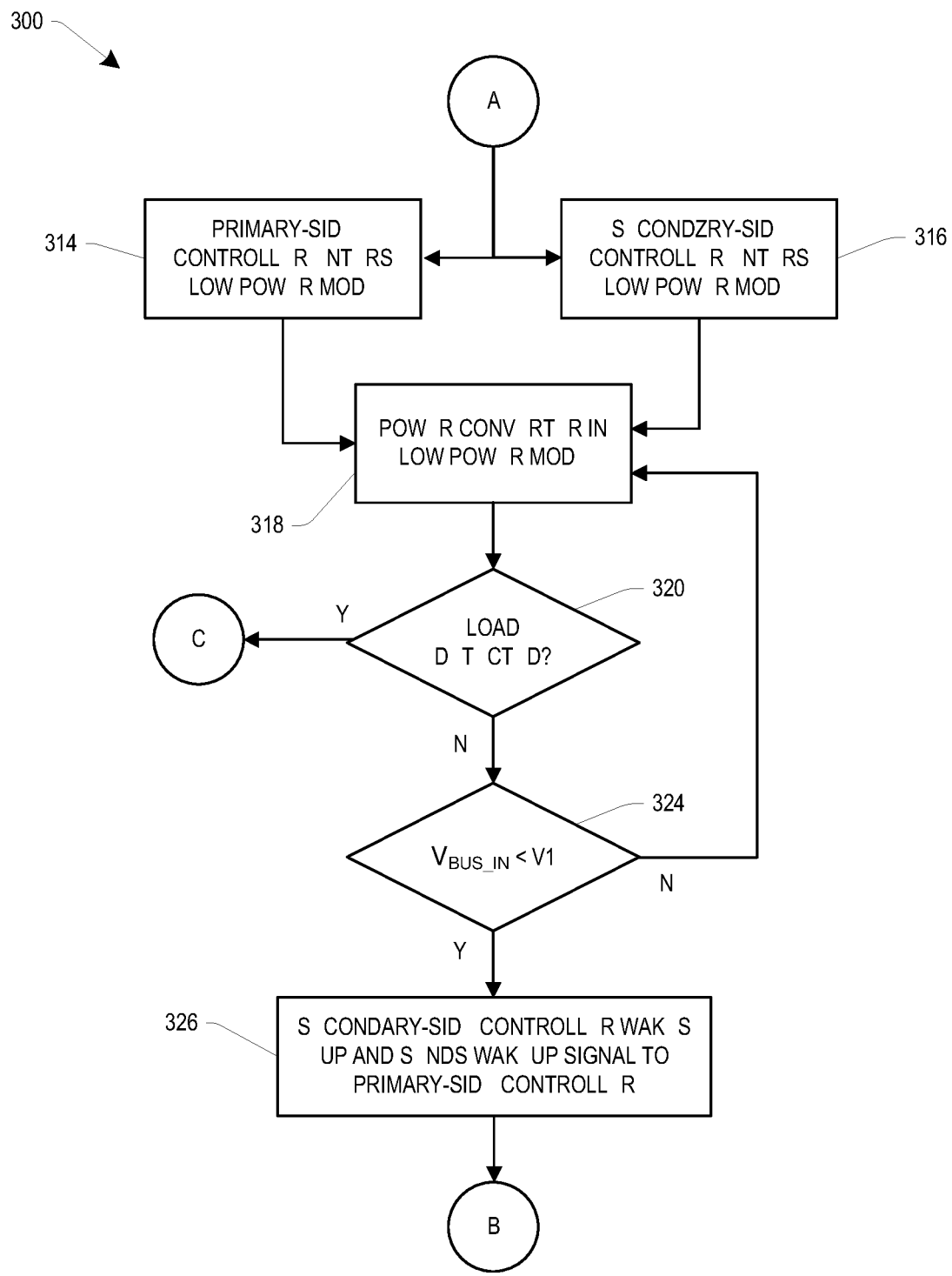
Figure 3C:
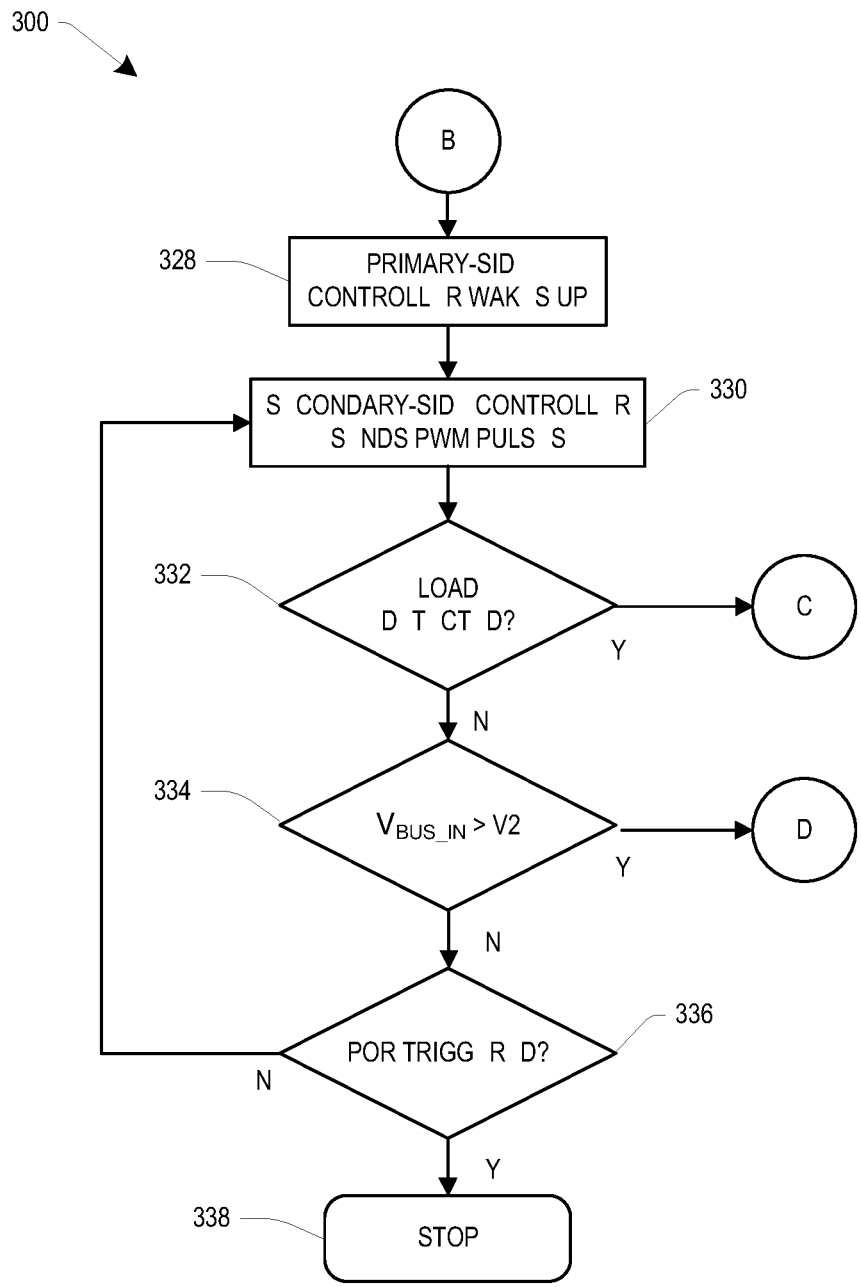

FIGS. 3A-3C illustrate a flow diagram of a method 300 for power mode control, according to some embodiments. The method 300 starts at 302 in FIG. 3A. At 304 the AC power is enabled for the power converter 100, for example, when the power converter 100 is coupled to the external power source to receive $AC_{IN}$. At 306, the power converter 100 is in active mode. In active mode, power is delivered to a load device connected to the output connector 128. The secondary-side controller 104 generates PWM signals for the primary-side controller 102 to control the power converter 100 to deliver power at the voltage and current specified according to the contract determined for the load device. At 308, the secondary-side controller 104 detects the absence of a load device on the output connector 128. For example, a previously connected load device may be disconnected from the output connector 128. Responsive to the absent load condition at 308, the secondary-side controller 104 stops sending PWM signals at 310, since output power is not required. At 312, the secondary-side controller 104 sends a low power mode signal to the primary-side controller 102 via the pulse-transformer 174. At transition A the method 300 continues in FIG. 3B.

Referring to FIG. 3B, the method 300 enters from transition A. At 314, the primary-side controller 102 enters low power mode. In the low power mode, the ACF circuit 121, the HS driver 123, and the OVP unit 171 are turned off (designated by a dash-dot line pattern). The pulse detector 181 and the X-cap discharge unit 183 operate in a low current mode (designated by a long dash-short dash line pattern). In active mode, the control block 186 pulls down the gate of an enable transistor 121E (p-type) to provide VCC to the ACF gate driver 121D. In the low power mode, the control block 186 disables pull-down on the node 121V which results in disabling of the transistor 121E via the resistor between VCC and the node 121V. Providing VCC on the gate of the enable transistor 121E maintains the off state of the ACF gate driver 121D. A filter 121F connected between the gate and drain of the ACF switch 121S maintains the off state of the ACF switch 121S. In some embodiments, in the low power mode of the primary-side controller 102, the current consumption is less than about 30 μA.

At 316, the secondary-side controller 104 enter low power mode. In the low power mode, the secondary-side controller 104 turns off the SR sense unit 202, the PWM and the ramp generator in the PWM circuit 206, the PS gate driver, the OV-UV units, the VBUS_IN and VBUS_OUT discharge units, and the VCONN unit in the SSPF circuit 208, the charger detect unit in the interface circuit 210, the MCU subsystem 212, and the feedback circuit 214 (designated by a dash-dot line pattern). The SR gate driver 204, the PWM driver in the PWM circuit 206, the LDO and the HV regulator in the SSPF circuit 208, the deepsleep reference and the BMC PHY in the interface circuit 210, and the wakeup timer 212W operate in a low current mode (designated by a long dash-short dash line pattern). In some embodiments, in the low power mode of the secondary-side controller 104, the current consumption is less than about 170 μA.

At 318, the power converter 100 is in low power mode. In some embodiments, the power consumption of the power converter 100 in the low power mode is less than about 5 mW, for example, less than 3 mW.

In some embodiments, the secondary-side controller 104 employs a periodic timer, such as a wakeup timer 212W in the MCU subsystem 212 to trigger wakeup interrupts. The primary-side controller 102 implements functions such as load detection or output voltage maintenance during the wakeup interrupt. In some embodiments, the primary-side controller 102 implements input voltage monitoring during wakeup interrupts to allow discharging of the X-cap 111 if the $AC_{IN}$ signal is removed.

At 320, the output connector 128 is monitored for a connection to a load device. If a load is detected at 320, the method 300 transitions at C back to FIG. 3A. At 322, the secondary-side controller 104 enters active mode and sends an active mode signal to the primary-side controller 102. The power converter 100 resumes active mode operation at 306. If no load is detected at 320, the secondary-side controller 104 monitors the input voltage, $V_{BUS\_IN}$. The secondary-side controller 104 may monitor the $V_{BUS\_IN}$ voltage responsive to a wakeup interrupt.

During low power mode, the $V_{BUS\_IN}$ voltage is maintained at a predetermined voltage, V1, such as about 4 V using the HYS comparator block with a reference from the deepsleep reference block. If the $V_{BUS\_IN}$ voltage is not less than V1 during the wakeup interrupt at 324, the power converter 100 remains in low power mode at 218. If the $V_{BUS\_IN}$ voltage is less than V1 during the wakeup interrupt at 324, the secondary-side controller 104 enters a wake-up mode and sends a wakeup signal to the primary-side controller 102 at 326. In some embodiments, V1 is defined using the deepsleep reference unit in the interface circuit 210.

In the wakeup mode, the method transitions at B to FIG. 3C. At 328, the primary-side controller 102 wakes up and powers up the control unit 196, the boost unit 159, the LS gate driver 119, the current sense unit 120, and the bias generator and oscillator 187 dash-dot-dot-dash line pattern). The control unit 196, the boost unit 159, the LS gate driver 119, the current sense unit 120, and the bias generator and oscillator 187 are otherwise powered down during the low power mode. At 330, the secondary-side controller 104 sends PWM pulses to the primary-side controller 102 via the pulse transformer 174 to supply power to the VBUS output and hence increase the output voltage.

At 332, the primary-side controller 102 determines if a load device is connected to the output connector 128. If a load device is detected at 332, the method 300 transitions at C to FIG. 3A and the secondary-side controller 104 enters active mode and sends an active mode signal to the primary-side controller 102. The power converter 100 resumes active mode operation at 306.

If no load device is detected at 332, the secondary-side controller 104 determines at 334 if the $V_{BUS\_IN}$ voltage is greater than V2, such as about 4.1 V. In some embodiments, V2 is defined using the deepsleep reference unit in the interface circuit 210. If the $V_{BUS\_IN}$ voltage is greater than V2 at 334, the method 300 transitions at D to FIG. 3A, where the secondary-side controller 104 stops sending PWM signals at 310 and sends a low power mode signal to the primary-side controller 102 at 312. If the output voltage is not greater than V2 at 334, the secondary-side controller 104 determines if a power on reset condition (POR) is triggered.

If a POR is triggered at 336, the method 300 terminates at 338. If no POR is triggered at 336, the secondary-side controller 104 continues sending PWM pulses at 330 to increase the output voltage.

Figure 4:
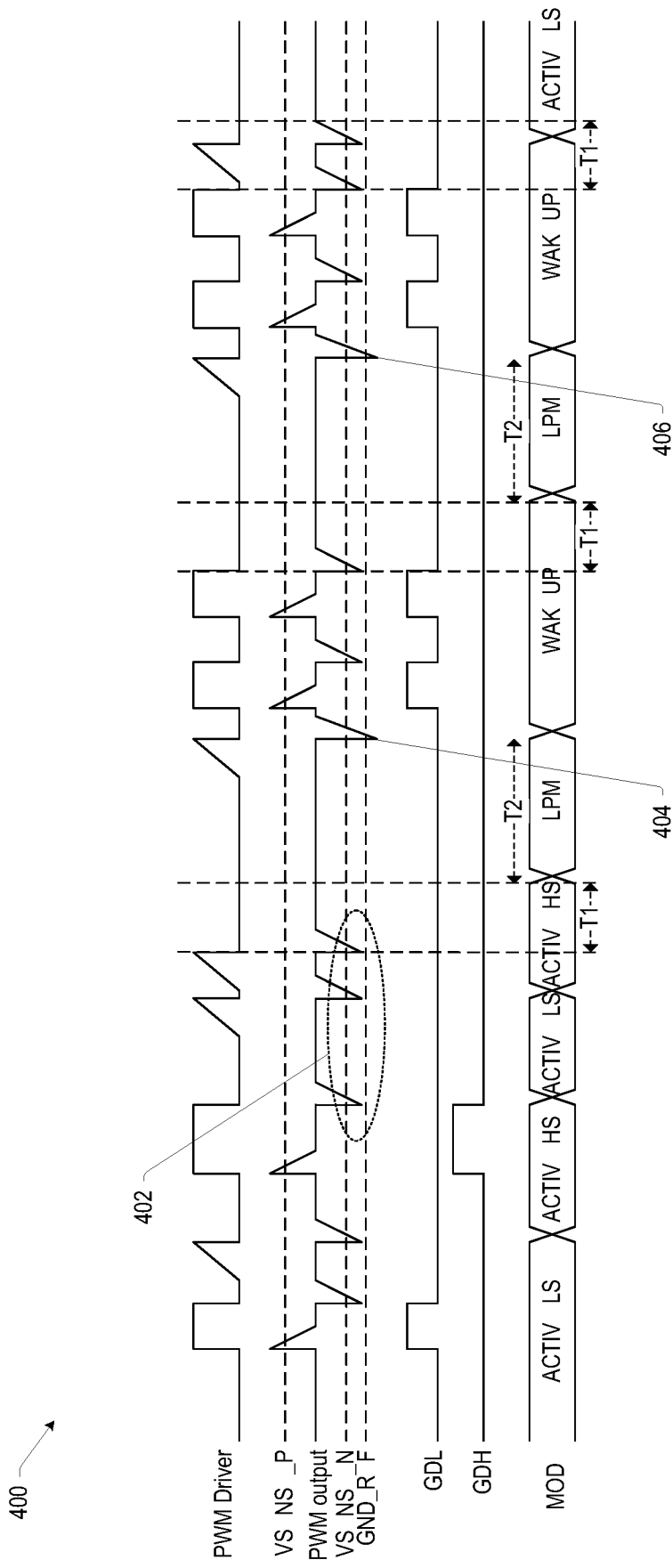
FIG. 4 is a timing diagram illustrating power mode control, according to some embodiments.

FIG. 4 is a timing diagram 400 illustrating power mode control, according to some embodiments. In some embodiments, the secondary-side controller 104 communicates with the primary-side controller 102 using PWM driver in the PWM circuit 206. The PWM output signal is communicated over the pulse transformer 174 to the primary-side controller 102. The pulse detector 181 in the primary-side controller 102 detects the PWM output signal. During active mode the secondary-side controller 104 sends signals indicating the switching interval for the primary-side controller 102 to provide power to the output connector 128. In some embodiments, the PWM signal is also used by the secondary-side controller 104 to signal the power mode to the primary-side controller 102.

During active mode, the pulse detector 181 uses a differential configuration that compares the PWM output signal to a high threshold, VSENSE_P and a low threshold, VSENSE_N. A positive pulse is detected by the pulse detector 181 if the PWM output signal exceeds VSENSE_P and a negative pulse is detected by the pulse detector 181 if the PWM output signal falls below VSENSE_N. The differential configuration requires two sets of comparators and reference generators. In the low power mode and the wakeup mode, the pulse detector 181 implements a single ended configuration, where only negative pulses are used for communication. In some embodiments, the pulse detector 181 uses a ground reference instead of VSENSE_N for detecting negative pulses thereby allowing the use of a single comparator and no separate reference generator, which reduces the power consumption of the pulse detector 181.

In active mode, the secondary-side controller 104 sends pulses to alternate between active high side (ACF circuit 121 active and power switch 117 inactive) and active low side intervals (ACF circuit 121 inactive and power switch 117 active). In some embodiments, the primary-side controller 102 generates a low power mode signal by sending three successive negative pulses at 402. Since the primary-side controller 102 is an active mode, the differential configuration may be used by the pulse detector 181. In some embodiments, the transition between active and low power modes takes about 30 μs (T1). At 404, the secondary-side controller 104 sends a wakeup signal, such as a single negative pulse that falls below the ground reference, and the primary-side controller 102 wakes up. In some embodiments, the wakeup timer 212W generates a wakeup signal after about 200 ms (T2). In some embodiments, the secondary-side controller 104 sends PWM pulses during the wakeup interval to maintain the output voltage. Following the output voltage maintenance, the secondary-side controller 104 sends a low power mode signal at 406 and the cycle repeats.

Figure 5:
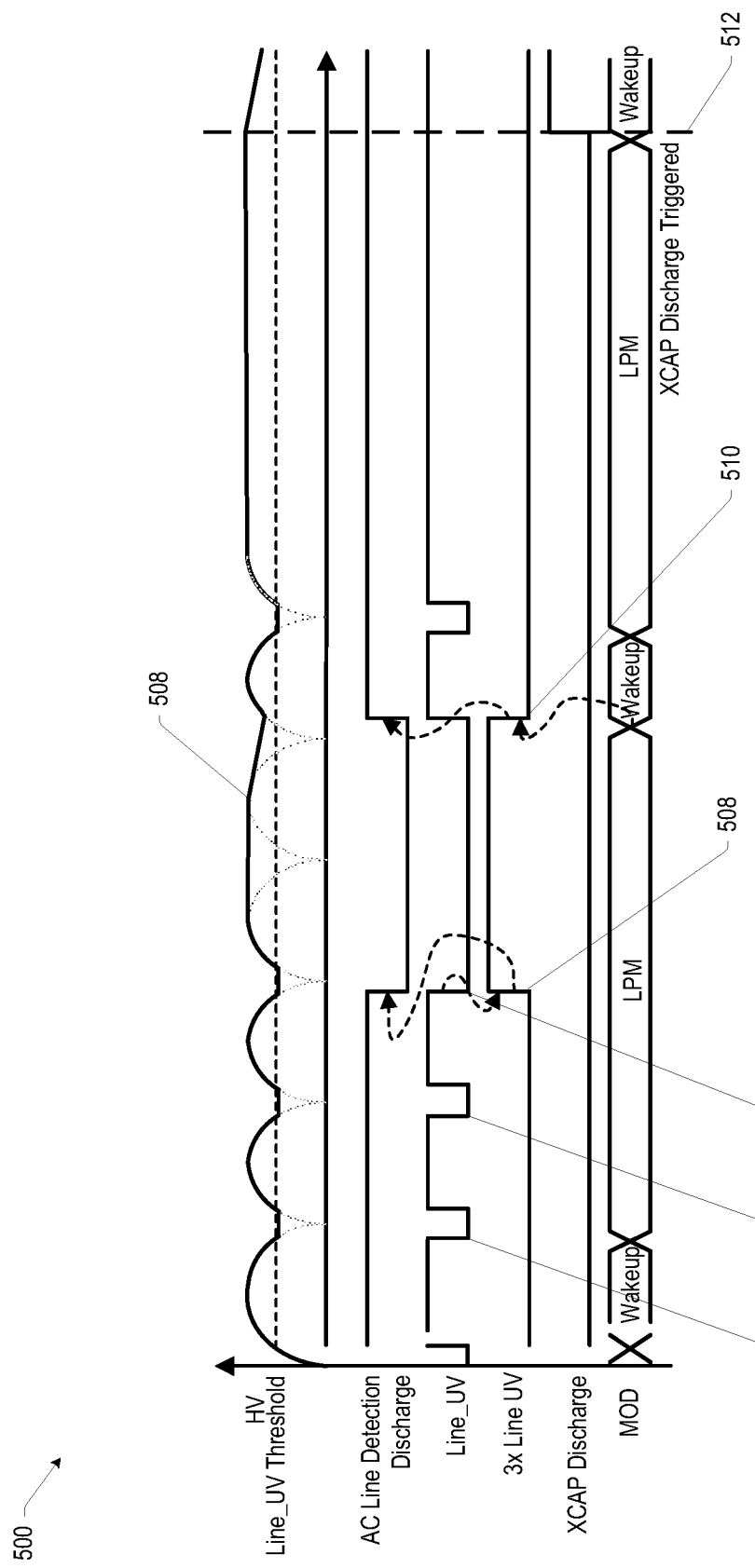
FIG. 5 is a timing diagram illustrating an across-the-line capacitor (X-cap) discharge control, according to some embodiments.

FIG. 5 is a timing diagram 500 illustrating X-cap discharge control, according to some embodiments. X-cap discharge control is implemented to discharge the X-cap 111 so in the event the power converter 100 is unplugged from the external power source, the voltage present on the X-cap 111 will not shock the user. The X-cap voltage (HV) is compared to an undervoltage threshold. During low power mode, the high voltage startup unit 182 remains active to detect undervoltage (UV) conditions. In some embodiments, the high voltage startup unit 182 is configured to signal a UV persistence signal if the UV condition persists for N checks, such as 3 checks. Referring to FIG. 5, the high voltage startup unit 182 detects UV conditions at 502, 504, 506 and asserts a UV persistence signal at 508. In some embodiments, the X-cap discharge unit 183 operates in a low current mode during low power mode and only checks for a line UV fault once during a wakeup cycle, such as at 510. The X-cap discharge unit 183 turns off X-cap discharge if the UV persistence signal is present. At 512, the X-cap discharge unit 183 determines that the UV persistence signal is not present and enables X-cap discharge as AC input plug was disconnected and 3 checks of Line_UV did not happen at the time of wakeup 512.

An exemplary embodiment may include a computer-readable medium (e.g., such as firmware, flash memory, or the like) storing instructions which, when executed by a device (e.g., such as the secondary-side controller 104 in FIGS. 1A, 1B, and 2), are configured to perform at least part of the method described in FIGS. 3A-3C. For example, one or more embodiments may comprise a non-transitory computer-readable medium storing a set of processor-executable instructions which, when executed by a semiconductor device controller comprising at least a processor (e.g., a CPU or another core processor) and memory, are configured to facilitate operations according to the techniques set forth herein. In some embodiments, the processor-executable instructions, when executed, are configured to facilitate performance of a method, such as at least some of the aforementioned method(s). In some embodiments, the processor-executable instructions, when executed, are configured to facilitate implementation of a system, such as at least some of the one or more aforementioned system(s). Many such computer-readable media may be devised by those of ordinary skill in the art that are configured to operate in accordance with the techniques presented herein.

Figure 6:
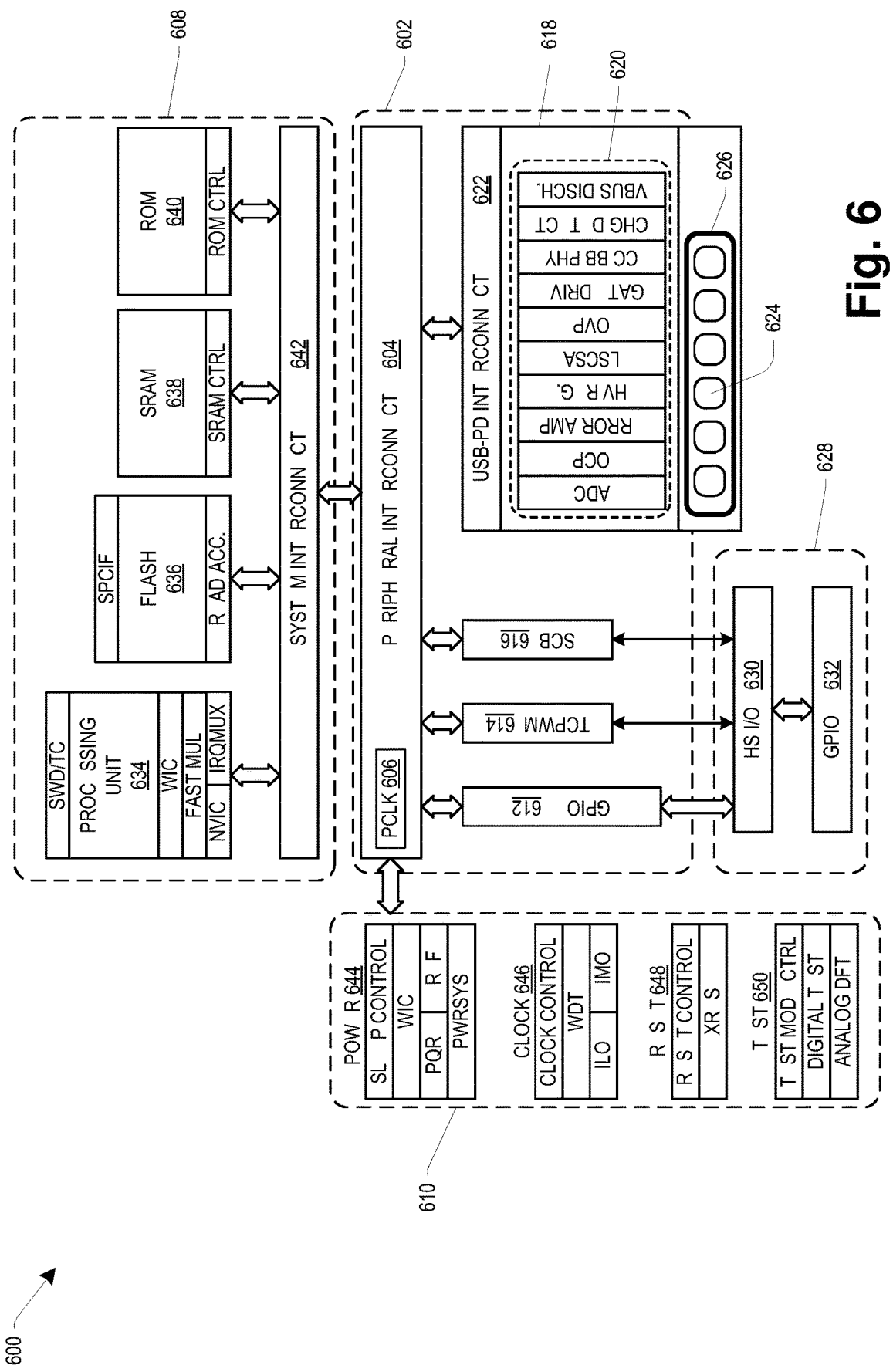
FIG. 6 illustrates an exemplary embodiment of a system for a USB device, in accordance with some embodiments.

FIG. 6 is a block diagram illustrating a system 600 for a USB device, in accordance with some embodiments. The system 600 may include a peripheral subsystem 602 that includes a number of components for use in the USB power delivery (USB-PD). The peripheral subsystem 602 may include a peripheral interconnect 604 including a peripheral clock module (PCLK) 606 for providing clock signals to the various components of the peripheral subsystem 602. The peripheral interconnect 604 may be a peripheral bus, such as a single level or Multi-level Advanced High Performance Bus (AHB), and can provide a data and control interface between the peripheral subsystem 602, a CPU subsystem 608, and system resources 610. The peripheral interconnect 604 may include controller circuitry, such as direct memory access (DMA) controllers, which may be programmed to transfer data between peripheral blocks without input from the CPU subsystem 608, without control of the CPU subsystem 608, or without stressing the same transfer.

The peripheral interconnect 604 may be used to couple the peripheral subsystem 602 components to other components of the system 600. A number of general purpose inputs/outputs (GPIOs) 612 may be coupled to the peripheral interconnect 604 for sending and receiving signals. The GPIOs 612 may include circuitry configured to implement various functions such as pull-up, pull-down, input threshold selection, input and output buffer enable/disable, single multiplexing, and so on. Other functions can also be implemented by the GPIOs 612. One or more timer/counter/pulse width modulators (TCPWM) 614 may also be coupled to the peripheral interconnect and may include circuitry to implement timing circuits (timers), counters, pulse width modulators (PWMs), decoders, and other digital functions associated with I/O signals work and can provide digital signals for system components of the system 600. The peripheral subsystem 602 may also include one or more Serial Communication Blocks (SCBs) 616 for implementing serial communication interfaces such as I2C, Serial Peripheral Interface (SPI), Universal Asynchronous Receiver/Transmitter (UART), Controller Area Network (CAN), CXPI (Clock Extension Peripheral Interface), etc.

For USB power delivery applications, the peripheral subsystem 602 may include a USB power delivery subsystem 618 coupled to the peripheral interconnect 604 and including a set of USB PD modules 620 for use with the USB power delivery. The USB PD modules 620 may be coupled to the peripheral interconnect 604 by a USB-PD interconnect 622. The USB PD modules 620 may include: an analog-to-digital converter (ADC) module for converting various analog signals into digital signals; an error amplifier (AMP) that regulates the output voltage on the VBUS line by PD contract; a high voltage (HV) regulator for converting the power source voltage to a precise voltage (such as 3.5-5V) to power the system 600; a low-side current sense amplifier (LSCSA) to accurately measure load current, an over-voltage protection (OVP) module and an over-current protection (OCP) module to provide over-current and over-voltage protection on the VBUS line with configurable thresholds and response times; one or more gate drivers for external power field effect transistors (FETs) used in USB power delivery in provider and consumer configurations; and a communications channel PHY (CC-BB-PHY) module to support communications on a Type-C communications channel (CC) line. The USB PD modules 620 may also include a charger detection module to determine if charging circuitry is present and coupled to the system 600 and a VBUS discharge module to control the discharge of voltage on the VBUS. The VBUS discharge module may be configured to couple to a power source node on the VBUS line or to an output (power sink) node on the VBUS line and adjust the voltage on the VBUS line to the desired voltage level (i.e., the voltage level specified in the PD-Contract negotiated voltage level). The USB power delivery subsystem 618 may also include pads 624 for external connections and Electrostatic Discharge (ESD) suppression circuitry 626 that may be required on a Type-C port. The USB PD modules 620 may also include a communication module for retrieving and transmitting information, such as control signals, such as from the secondary-side controller 104 to the primary-side controller 102.

The GPIOs 612, the TCPWM 614, and the SCB 616 may be coupled to an input/output (I/O) subsystem 628, which may include a high-speed (HS) I/O matrix 630 connected to a number of GPIOs 632. The GPIOs 612, the TCPWM 614, and the SCB 616 may be coupled to the GPIOs 632 through the HS-I/O matrix 630.

The central processing unit (CPU) subsystem 608 is provided for processing instructions, storing program information and data. The CPU subsystem 608 may include one or more processing units 634 for executing instructions and reading from and writing to memory locations from a number of memories. The processing unit 634 may be a processor suitable for operation in an integrated circuit (IC) or system-on-chip (SOC) device. In some embodiments, the processing unit 634 may be optimized for low power operation with extensive clock gating. In this embodiment, different internal control circuits can be implemented for processing unit operation in different power states. For example, the processing unit 634 may include a single wire debug (SWD) module, a terminal count (TC) module, a wake-up interrupt controller (WIC) configured to wake up the processing unit from a sleep state, which may shut down power when the IC or SOC is in a sleep state, a fast multiplier, a nested vector interrupt controller (NVIC), and an interrupt multiplexer (IRQMUX). The CPU subsystem 608 may include one or more memories, including a flash memory 636, a static random access memory (SRAM) 638, and a read only memory (ROM) 640. The flash memory 636 may be non-volatile memory (NAND flash, NOR flash, etc.) configured to store data, programs, and/or other firmware instructions. The flash memory 636 may include system performance controller interface (SPCIF) registers and a read accelerator and, by being integrated into the CPU subsystem 608, improve access times. The SRAM 638 may be volatile memory configured to store data and firmware instructions accessible by the processing unit 634. The ROM 640 may be configured to store boot routines, configuration parameters, and other firmware parameters and settings that do not change during operation of the system 600. The SRAM 638 and the ROM 640 may have associated control circuitry. The processing unit 634 and the memory modules 636, 638, 640 may be coupled to a system interconnect 642 to route signals to and from the various components of the CPU subsystem 608 to other blocks or modules of the system 600. The system interconnect 642 can be implemented as a system bus, such as a single-level or multi-level AHB. The system interconnect 642 may be configured as an interface to couple the various components of the CPU subsystem 608 together. The system interconnect 642 may be coupled to the peripheral interconnect 604 to provide signal paths between the CPU subsystem 608 and components of the peripheral subsystem 602.

The system resources 610 may include a power module 644, a clock module 646, a reset module 648, and a test module 650. The power module 644 may include a sleep control module, a wake-up interrupt control (WIC) module, a power-on-reset (POR) module, a number of voltage references (REF), and a PWRSYS module. In some embodiments, the power module 644 may include circuitry that allows the system 600 to draw power from and/or provide power to external sources at different voltage and/or current levels and control operation in different power states, such as active, low power, or sleep. In various embodiments, more power states may be implemented as the system 600 throttles operation to achieve a desired power consumption or power output. For example, the secondary-side controller 104 can access secondary electrical parameters on the secondary side. The clock module 646 may include a clock control module, a watchdog timer (WDT), an internal low-speed oscillator (ILO), and an internal main oscillator (IMO). The reset module 648 may include a reset control module and an external reset module (XRES module). The test module 650 may include a module to control and enter a test mode, as well as test control modules for analog and digital functions (digital test and analog DFT).

The system 600 may be implemented in a monolithic (e.g., single) semiconductor die. In other embodiments, different parts or modules of the system 600 may be implemented on different semiconductor dies. For example, the memory modules 636, 638, 640 of the CPU subsystem 608 may be on-chip or off-chip. In still other embodiments, circuitry with separate dies can be packaged in a single "chip" or remain separate and arranged on a circuit board (or in a USB cable connector) as separate elements.

The system 600 can be implemented in a number of application contexts to provide USB PD functionality. In any application context, an electronic device (e.g., a USB-enabled device) may have an IC controller or SOC implementation embodied by the system 600 arranged and configured to perform operations according to the techniques described herein. In one embodiment, the system 600 may be arranged and configured in a personal computer (PC) power adapter for a laptop, notebook computer, and so on. In another embodiment, the system 600 may be housed in a power adapter (e.g., a wall charger) for a mobile electronic device (e.g. a smartphone, a tablet, etc.). In another embodiment, the system 600 may be placed and configured in a wall outlet configured to provide power via USB Type-A and/or Type-C port(s). In another embodiment, the system 600 may be arranged and configured in a car charger configured to provide power via USB Type-A and/or Type-C port(s). In yet another embodiment, the system 600 may be arranged and configured in a power bank that can be charged via a USB Type-A and/or Type-C port and then provide power to another electronic device. In other embodiments, a system such as the system 600, may be configured with the power switch gate control circuitry described herein and may be incorporated into various other USB-enabled electronic or electromechanical devices.

It should be understood that a system, such as the system 600, implemented on or as an IC controller, can be placed in various applications that vary in terms of the type of power source used and the direction in which power is supplied. For example, in the case of a car charger, the power source is a car battery that provides DC power, while in the case of a mobile power adapter, the power source is an AC wall outlet. Further, in the case of a PC power adapter, the flow of power input is from a provider device to a consumer device, while in the case of a power bank, the flow of power input can be in either direction, depending on whether the power bank is operating as a power provider (e.g., to power another device) or as a power consumer (e.g., to allow itself to be charged). For these reasons, the various applications of the system 600 should be considered in an illustrative rather than a limiting sense.

Providing low power mode for the power converter by powering down various components of the primary-side controller 102 and the secondary-side controller 104 results in average power consumption of less than 5 mW, or even less than 3 mW. Periodic wakeup intervals allows the output voltage to be maintained and protective functions, such as X-cap discharge to be implemented.

In an embodiment of the techniques presented herein, a Universal Serial Bus Power Delivery (USB-PD) system comprises a transformer comprising a primary-side coupled to receive a rectified alternating current (AC) input voltage at an input port, and a secondary-side connected to provide a direct current (DC) output voltage at an output port, a first power switch connected to the primary-side, a primary-side controller coupled to the first power switch to control operation of the transformer, wherein the primary-side controller is configured to transition from a primary-side active mode to a primary-side low power mode responsive to receiving a low power mode signal, and transition from the primary-side low power mode to the primary-side active mode responsive to receiving an active mode signal, and a secondary-side controller coupled to the output port, wherein the secondary-side controller configured to, responsive to detecting an absence of a load device on the output port, send the low power mode signal to the primary-side controller and transition from a secondary-side active mode to a secondary-side low power mode, and responsive to detecting a connection of the load device to the output port, transition from the secondary-side low power mode to the secondary-side active mode and send the active mode signal to the primary-side controller.

In an embodiment of the techniques presented herein, the primary-side controller comprises a detector communicatively coupled to the secondary-side controller, the detector is configured in a differential configuration in the primary-side active mode to detect the low power mode signal, and the detector is configured in a single ended configuration in the primary-side low power mode to detect the active mode signal.

In an embodiment of the techniques presented herein, the detector detects the low power mode signal using a positive reference signal and a negative reference signal in the differential configuration, and the detector detects the active mode signal using a ground reference signal in the single ended configuration.

In an embodiment of the techniques presented herein, the USB-PD system comprises a pulse transformer coupled between the secondary-side controller and the detector of the primary-side controller.

In an embodiment of the techniques presented herein, the USB-PD system comprises a second power switch connected between the input port and the primary-side, and a gate driver connected between the second power switch and the primary-side controller, wherein the primary-side controller is configured to power down the gate driver in the primary-side low power mode.

In an embodiment of the techniques presented herein, the USB-PD system comprises a pull-up transistor connected between a power voltage source and a power terminal of the gate driver, wherein the primary-side controller comprises a pull-down transistor connected between a gate terminal of the pull-up transistor and a reference voltage source, the primary-side controller is configured to assert an enable signal at a gate terminal of the pull-down transistor in the primary-side active mode, and the primary-side controller is configured to remove the enable signal in the primary-side low power mode.

In an embodiment of the techniques presented herein, the USB-PD system comprises a filter connected between a gate terminal of the second power switch and a source terminal of the second power switch.

In an embodiment of the techniques presented herein, the secondary-side controller configured to transition to a secondary-side wake-up mode, responsive to a voltage on the output port being less than a first threshold in the secondary-side wake-up mode, send a wake-up signal to the primary-side controller and send a drive signal to the primary-side controller, and responsive to the voltage on the output port being greater than a second threshold, send the low power mode signal to the primary-side controller and return to the secondary-side low power mode, and the primary-side controller is configured to responsive to receiving the wake-up signal, transition to a primary-side wake-up mode and control the first power switch based on the drive signal, and responsive to receiving the low power mode signal, returning to the primary-side low power mode.

In an embodiment of the techniques presented herein, the USB-PD system comprises an across-the-line capacitor (X-cap) coupled between the input port and the primary-side, wherein the secondary-side controller is configured to periodically transition from the secondary-side low power mode to a secondary-side wake-up mode, and send a wake-up signal to the primary-side controller in the secondary-side wake-up mode for each transition, and the primary-side controller is configured to transition to a primary-side wake-up mode responsive to receiving the wake-up signal, detect in the primary-side wake-up mode a low voltage condition at the input port, and discharge the X-cap responsive to detecting a predetermined number of low voltage conditions.

In an embodiment of the techniques presented herein, a method of operating a Universal Serial Bus Power Delivery (USB-PD) power converter comprises responsive to detecting an absence of a load device on an output port of the USB-PD power converter sending a low power mode signal from a secondary-side controller, coupled to control a secondary-side of the USB-PD power converter, to a primary-side controller coupled to control a primary-side of the USB-PD power converter, and transitioning the secondary-side controller from a secondary-side active mode to a secondary-side low power mode, transitioning the primary-side controller from a primary-side active mode to a primary-side low power mode responsive to receiving the low power mode signal, responsive to detecting a connection of the load device to the output port sending an active mode signal from the secondary-side controller to the primary-side controller, and transitioning the secondary-side controller from the secondary-side low power mode to the secondary-side active mode, and transitioning the primary-side controller from the primary-side low power mode to the primary-side active mode responsive to receiving the active mode signal.

In an embodiment of the techniques presented herein, the method comprises configuring a detector in the primary-side controller in a differential configuration in the primary-side active mode to detect the low power mode signal, and configuring the detector in a single ended configuration in the primary-side low power mode to detect the active mode signal.

In an embodiment of the techniques presented herein, detecting the low power mode signal comprises detecting the low power mode signal using a positive reference signal and a negative reference signal in the differential configuration, and detecting the active mode signal comprises detecting the active mode signal using a ground reference signal in the single ended configuration.

In an embodiment of the techniques presented herein, the method comprises communicating the active mode signal and the low power mode signal using a pulse transformer coupled between the secondary-side controller and the detector of the primary-side controller.

In an embodiment of the techniques presented herein, the method comprises controlling an active clamp flyback (ACF) circuit coupled to the primary-side using a gate driver coupled to the primary-side controller in the primary-side active mode, and powering down the gate driver in the primary-side low power mode.

In an embodiment of the techniques presented herein, the method comprises asserting, in the in the primary-side active mode, an enable signal at a gate terminal of a pull-down transistor connected between a gate terminal of a pull-up transistor and a reference voltage source, wherein the pull-up transistor is connected between a power voltage source and a power terminal of the gate driver, and removing the enable signal in the primary-side low power mode.

In an embodiment of the techniques presented herein, the method comprises maintaining an off state of the ACF circuit in the primary-side low power mode.

In an embodiment of the techniques presented herein, the method comprises transitioning the secondary-side controller to a secondary-side wake-up mode, responsive to a voltage on the output port being less than a first threshold, sending a wake-up signal to the primary-side controller in the secondary-side wake-up mode and sending a drive signal to the primary-side controller, transitioning the primary-side controller to a primary-side wake-up mode responsive to receiving the wake-up signal, controlling operation of a transformer of the USB-PD power converter by the primary-side controller based on the drive signal in the primary-side wake-up mode, responsive to the voltage on the output port being greater than a second threshold, sending the low power mode signal to the primary-side controller and returning the secondary-side controller to the secondary-side low power mode, and returning the primary-side controller to the primary-side low power mode responsive to receiving the low power mode signal.

In an embodiment of the techniques presented herein, the method comprises periodically transitioning from the secondary-side low power mode to a secondary-side wake-up mode, sending a wake-up signal to the primary-side controller in the secondary-side wake-up mode for each transition to the secondary-side wake-up mode, transitioning the primary-side controller to a primary-side wake-up mode responsive to receiving the wake-up signal, detecting, in the primary-side wake-up mode, a low voltage condition at an input port of the USB-PD power converter, and responsive to detecting a predetermined number of low voltage conditions, discharging an across-the-line capacitor (X-cap) coupled between the input port and the primary-side of the transformer.

In an embodiment of the techniques presented herein, a Universal Serial Bus Power Delivery (USB-PD) system comprises a transformer comprises a primary-side coupled to receive a rectified alternating current (AC) input voltage at an input port, and a secondary-side connected to provide a direct current (DC) output voltage at an output port, a first power switch connected between the input port and the primary-side, a second power switch connected between the output port and the secondary-side, a primary-side controller coupled to the first power switch, and a secondary-side controller coupled to the second power switch, wherein the secondary-side controller is configured to, responsive to detecting an absence of a load device on the output port, send a low power mode signal to the primary-side controller and transition from a secondary-side active mode to a secondary-side low power mode, the primary-side controller is configured to transition from a primary-side active mode to a primary-side low power mode responsive to receiving the low power mode signal, and wherein a power consumption of the transformer, the primary-side controller in the primary-side low power mode, and the secondary-side controller in the secondary-side low power mode is less than 5 mW.

In an embodiment of the techniques presented herein, the secondary-side controller is configured to, responsive to detecting a connection of the load device to the output port, transition from the secondary-side low power mode to a secondary-side active mode and send an active mode signal to the primary-side controller, and the primary-side controller is configured to transition from the primary-side low power mode to a primary-side active mode responsive to receiving the active mode signal.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" and/or the like is used herein to mean serving as an example, instance, illustration, etc., and not necessarily as advantageous. As used herein, "or" is intended to mean an inclusive "or" rather than an exclusive "or". In addition, "a" and "an" as used in this application can generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A Universal Serial Bus Power Delivery (USB-PD) system comprising:
    a transformer comprising a primary-side coupled to receive a rectified alternating current (AC) input voltage at an input port, and a secondary-side connected to provide a direct current (DC) output voltage at an output port;
    a first power switch connected to the primary-side;
    a second power switch connected between the input port and the primary-side;
    a primary-side controller coupled to the first power switch to control operation of the transformer;
    a gate driver connected between the second power switch and the primary-side controller, wherein the primary-side controller is configured to:
        transition from a primary-side active mode to a primary-side low power mode responsive to receiving a low power mode signal;
        power down the gate driver in the primary-side low power mode; and
        transition from the primary-side low power mode to the primary-side active mode responsive to receiving an active mode signal; and
    a secondary-side controller coupled to the output port, wherein the secondary-side controller configured to:
        responsive to detecting an absence of a load device on the output port, send the low power mode signal to the primary-side controller and transition from a secondary-side active mode to a secondary-side low power mode; and
        responsive to detecting a connection of the load device to the output port, transition from the secondary-side low power mode to the secondary-side active mode and send the active mode signal to the primary-side controller.

2. The USB-PD system of claim 1, wherein:
    the primary-side controller comprises a detector communicatively coupled to the secondary-side controller;
    the detector is configured in a differential configuration in the primary-side active mode to detect the low power mode signal; and
    the detector is configured in a single ended configuration in the primary-side low power mode to detect the active mode signal.

3. The USB-PD system of claim 2, wherein:
    the detector detects the low power mode signal using a positive reference signal and a negative reference signal in the differential configuration; and
    the detector detects the active mode signal using a ground reference signal in the single ended configuration.

4. The USB-PD system of claim 2, comprising:
    a pulse transformer coupled between the secondary-side controller and the detector of the primary-side controller.

5. The USB-PD system of claim 1, comprising:
    a pull-up transistor connected between a power voltage source and a power terminal of the gate driver, wherein:
        the primary-side controller comprises a pull-down transistor connected between a gate terminal of the pull-up transistor and a reference voltage source;
        the primary-side controller is configured to assert an enable signal at a gate terminal of the pull-down transistor in the primary-side active mode; and
        the primary-side controller is configured to remove the enable signal in the primary-side low power mode.

6. The USB-PD system of claim 1, comprising:
    a filter connected between a gate terminal of the second power switch and a source terminal of the second power switch.

7. The USB-PD system of claim 1, wherein:
    the secondary-side controller configured to:
        transition to a secondary-side wake-up mode;
        responsive to a voltage on the output port being less than a first threshold in the secondary-side wake-up mode, send a wake-up signal to the primary-side controller and send a drive signal to the primary-side controller; and
        responsive to the voltage on the output port being greater than a second threshold, send the low power mode signal to the primary-side controller and return to the secondary-side low power mode; and
    the primary-side controller is configured to:
        responsive to receiving the wake-up signal, transition to a primary-side wake-up mode and control the first power switch based on the drive signal; and
        responsive to receiving the low power mode signal, returning to the primary-side low power mode.

8. The USB-PD system of claim 1, comprising:
an across-the-line capacitor (X-cap) coupled between the input port and the primary-side, wherein:
the secondary-side controller is configured to:
periodically transition from the secondary-side low power mode to a secondary-side wake-up mode; and
send a wake-up signal to the primary-side controller in the secondary-side wake-up mode for each transition, and
the primary-side controller is configured to:
transition to a primary-side wake-up mode responsive to receiving the wake-up signal;
detect in the primary-side wake-up mode a low voltage condition at the input port; and
discharge the X-cap responsive to detecting a predetermined number of low voltage conditions.

9. The USB-PD system of claim 1, wherein:
a power consumption of the transformer, the primary-side controller in the primary-side low power mode, and the secondary-side controller in the secondary-side low power mode is less than 5 mW.

10. A method of operating a Universal Serial Bus Power Delivery (USB-PD) power converter comprising:
responsive to detecting an absence of a load device on an output port of the USB-PD power converter:
sending a low power mode signal from a secondary-side controller, coupled to control a secondary-side of the USB-PD power converter, to a primary-side controller coupled to control a primary-side of the USB-PD power converter; and
transitioning the secondary-side controller from a secondary-side active mode to a secondary-side low power mode;
transitioning the primary-side controller from a primary-side active mode to a primary-side low power mode responsive to receiving the low power mode signal;
responsive to detecting a connection of the load device to the output port:
sending an active mode signal from the secondary-side controller to the primary-side controller; and
transitioning the secondary-side controller from the secondary-side low power mode to the secondary-side active mode;
transitioning the primary-side controller from the primary-side low power mode to the primary-side active mode responsive to receiving the active mode signal;
controlling an active clamp flyback (ACF) circuit coupled to the primary-side using a gate driver coupled to the primary-side controller in the primary-side active mode; and
powering down the gate driver in the primary-side low power mode.

11. The method of claim 10, comprising:
configuring a detector in the primary-side controller in a differential configuration in the primary-side active mode to detect the low power mode signal; and
configuring the detector in a single ended configuration in the primary-side low power mode to detect the active mode signal.

12. The method of claim 11, wherein:
detecting the low power mode signal comprises detecting the low power mode signal using a positive reference signal and a negative reference signal in the differential configuration; and
detecting the active mode signal comprises detecting the active mode signal using a ground reference signal in the single ended configuration.

13. The method of claim 11, comprising:
communicating the active mode signal and the low power mode signal using a pulse transformer coupled between the secondary-side controller and the detector of the primary-side controller.

14. The method of claim 10, comprising:
asserting, in the in the primary-side active mode, an enable signal at a gate terminal of a pull-down transistor connected between a gate terminal of a pull-up transistor and a reference voltage source, wherein the pull-up transistor is connected between a power voltage source and a power terminal of the gate driver; and
removing the enable signal in the primary-side low power mode.

15. The method of claim 10, comprising:
maintaining an off state of the ACF circuit in the primary-side low power mode.

16. The method of claim 10, comprising:
transitioning the secondary-side controller to a secondary-side wake-up mode;
responsive to a voltage on the output port being less than a first threshold, sending a wake-up signal to the primary-side controller in the secondary-side wake-up mode and sending a drive signal to the primary-side controller;
transitioning the primary-side controller to a primary-side wake-up mode responsive to receiving the wake-up signal;
controlling operation of a transformer of the USB-PD power converter by the primary-side controller based on the drive signal in the primary-side wake-up mode;
responsive to the voltage on the output port being greater than a second threshold, sending the low power mode signal to the primary-side controller and returning the secondary-side controller to the secondary-side low power mode; and
returning the primary-side controller to the primary-side low power mode responsive to receiving the low power mode signal.

17. The method of claim 10, comprising:
periodically transitioning from the secondary-side low power mode to a secondary-side wake-up mode;
sending a wake-up signal to the primary-side controller in the secondary-side wake-up mode for each transition to the secondary-side wake-up mode;
transitioning the primary-side controller to a primary-side wake-up mode responsive to receiving the wake-up signal;
detecting, in the primary-side wake-up mode, a low voltage condition at an input port of the USB-PD power converter; and
responsive to detecting a predetermined number of low voltage conditions, discharging an across-the-line capacitor (X-cap) coupled between the input port and the primary-side of the transformer.

18. The method of claim 10, wherein:
after transitioning the secondary-side controller from the secondary-side active mode to the secondary-side low power mode and transitioning the primary-side controller from the primary-side active mode to the primary-side low power mode a power consumption of a transformer coupled between the primary side and the secondary side, the primary-side controller, and the secondary-side controller is less than 5 mW.

19. A Universal Serial Bus Power Delivery (USB-PD) system comprising:

a transformer comprising a primary-side coupled to receive a rectified alternating current (AC) input voltage at an input port, and a secondary-side connected to provide a direct current (DC) output voltage at an output port;

a first power switch connected between the input port and the primary-side;

a second power switch connected between the output port and the secondary-side;

an across-the-line capacitor (X-cap) coupled between the input port and the primary-side;

a primary-side controller coupled to the first power switch; and a secondary-side controller coupled to the second power switch, wherein:

the secondary-side controller is configured to, responsive to detecting an absence of a load device on the output port, send a low power mode signal to the primary-side controller and transition from a secondary-side active mode to a secondary-side low power mode;

the primary-side controller is configured to transition from a primary-side active mode to a primary-side low power mode responsive to receiving the low power mode signal;

the secondary-side controller is configured to, responsive to detecting a connection of the load device to the output port, transition from the secondary-side low power mode to a secondary-side active mode and send an active mode signal to the primary-side controller;

the primary-side controller is configured to transition from the primary-side low power mode to a primary-side active mode responsive to receiving the active mode signal;

the secondary-side controller is configured to:
periodically transition from the secondary-side low power mode to a secondary-side wake-up mode; and
send a wake-up signal to the primary-side controller in the secondary-side wake-up mode for each transition, and the primary-side controller is configured to:
transition to a primary-side wake-up mode responsive to receiving the wake-up signal;
detect, in the primary-side wake-up mode, a low voltage condition at the input port; and
discharge the X-cap responsive to detecting a predetermined number of low voltage conditions.

20. The USB-PD system of claim 19, wherein:
a power consumption of the transformer, the primary-side controller in the primary-side low power mode, and the secondary-side controller in the secondary-side low power mode is less than 5 mW.

* * * * *